(12) United States Patent
Arnault et al.

(10) Patent No.: US 9,702,399 B2
(45) Date of Patent: Jul. 11, 2017

(54) TENSIONING ROLLER OR WINDER DEVICE AND METHOD OF MANUFACTURE

(71) Applicants: Benoît Arnault, Saint-Cye-sur-Loire (FR); Laurent Varnoux, Tours (FR)

(72) Inventors: Benoît Arnault, Saint-Cye-sur-Loire (FR); Laurent Varnoux, Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/636,214

(22) Filed: Mar. 3, 2015

(65) Prior Publication Data
US 2015/0176641 A1 Jun. 25, 2015

Related U.S. Application Data

(62) Division of application No. 12/741,529, filed as application No. PCT/FR2008/051906 on Oct. 22, 2008.

(30) Foreign Application Priority Data

Nov. 6, 2007 (FR) ..................................... 07 58818

(51) Int. Cl.
| | | |
|---|---|---|
| F16C 13/00 | (2006.01) |
| B29C 45/14 | (2006.01) |
| F16C 35/073 | (2006.01) |
| F16H 7/20 | (2006.01) |
| F16H 7/12 | (2006.01) |
| F16C 23/10 | (2006.01) |
| F16H 7/08 | (2006.01) |

(Continued)

(52) U.S. Cl.
CPC ........ *F16C 13/006* (2013.01); *B29C 45/1459* (2013.01); *F16C 23/10* (2013.01);
(Continued)

(58) Field of Classification Search
CPC .... F16C 16/006; F16C 13/006; F16C 35/073; F16H 2007/0865; F16H 7/1245; F16H 7/20; B29C 45/1459
(Continued)

(56) References Cited

U.S. PATENT DOCUMENTS 2,349,281 A * 5/1944 Kendall ..................... F16H 7/20
29/898.057
4,602,875 A * 7/1986 Doerr ..................... F16C 13/006
384/477

(Continued)

FOREIGN PATENT DOCUMENTS

| DE | 2834979 A1 | 2/1980 |
| DE | 4006210 A1 | 9/1990 |

(Continued)

*Primary Examiner* — Michael Riegelman
(74) *Attorney, Agent, or Firm* — Bryan Peckjian; SKF USA Inc. Patent Dept.

(57) ABSTRACT

A chain or belt tensioning roller or winder device having a rolling bearing, the rolling bearing comprising an inner ring, an outer ring and at least one row of rolling elements mounted between the rings. The pulley is overmolded onto the outer ring and with a fixing screw axially immobilized with respect to the rolling bearing. The device comprises a sleeve overmolded inside the bore of the inner ring and provided with a through-bore for mounting the fixing screw. The sleeve is provided with means of axially retaining the fixing screw inside the through-bore of the sleeve.

10 Claims, 16 Drawing Sheets

(51) Int. Cl.
*F16B 41/00* (2006.01)
*F16C 19/08* (2006.01)

(52) U.S. Cl.
CPC ......... *F16C 35/073* (2013.01); *F16H 7/1245* (2013.01); *F16H 7/20* (2013.01); *F16B 41/002* (2013.01); *F16C 19/08* (2013.01); *F16C 2361/63* (2013.01); *F16H 2007/088* (2013.01); *F16H 2007/0842* (2013.01); *F16H 2007/0865* (2013.01); *Y10T 29/49549* (2015.01)

(58) Field of Classification Search
USPC ........................................................ 474/166
See application file for complete search history.

(56) References Cited

U.S. PATENT DOCUMENTS

| | | | | |
|---|---|---|---|---|
| 4,848,938 A * | 7/1989 | Haas | ..................... | F16C 13/006 384/536 |
| 4,917,655 A * | 4/1990 | Martin | .................. | F16H 7/1218 474/112 |
| 6,142,675 A * | 11/2000 | Brandenstein | .... | B29C 45/14491 384/537 |
| 6,357,926 B1 * | 3/2002 | Hauck | ................... | F16C 13/006 384/546 |
| 7,041,020 B2 * | 5/2006 | Singer | ................... | F16C 13/006 474/152 |
| 7,695,385 B2 * | 4/2010 | Barraud | .................. | F16C 19/06 384/484 |
| 8,636,419 B2 * | 1/2014 | Mola | ..................... | F16C 13/006 29/898.063 |
| 2011/0111900 A1 * | 5/2011 | Wilson | .................. | F16C 13/006 474/166 |

FOREIGN PATENT DOCUMENTS

| | | |
|---|---|---|
| DE | 29805581 U1 | 5/1998 |
| DE | 10035488 A1 | 1/2002 |
| FR | 2758375 B1 | 2/2000 |
| WO | 2007085333 A1 | 8/2007 |

* cited by examiner

OVERMOLDING A PULLEY ONTO AN OUTER RING OF A ROLLING BEARING SUCH THAT THE PULLEY EXTENDS RADIALLY OUTWARD FROM AN OUTER SURFACE OF THE OUTER RING, THE OVERMOLDING PROCESS COHESIVELY AFFIXING AN OPENING OF THE PULLEY ONTO THE OUTER RING, THE ROLLING BEARING ALSO INCLUDING AN INNER RING AND AT LEAST ONE ROW OF ROLLING ELEMENTS DISPOSED BETWEEN THE INNER RING AND THE OUTER RING, AND THE INNER RING DEFINING A BORE SURROUNDING A ROLLING BEARING AXIS OF ROTATION

OVERMOLDING A CYLINDRICAL SLEEVE IN THE BORE OF THE INNER RING, THE SLEEVE COMPRISING A CYLINDER HAVING A CYLINDER OUTER SURFACE AND A CYLINDER INNER SURFACE, THE CYLINDER OUTER SURFACE BEING COHESIVELY AFFIXED TO THE BORE OF THE INNER RING AND THE CYLINDER INNER SURFACE DEFINING A CYLINDRICAL THROUGH BORE HAVING A FIRST END AND A SECOND END

INSERTING A FIRST FIXING SCREW HAVING A FIRST END AND A SECOND END INTO THE FIRST END OF THE THROUGH BORE SO THAT THE FIRST END OF THE FIRST FIXING SCREW EXTENDS FROM THE FIRST END OF THE THROUGH BORE AND SUCH THAT THE SECOND END OF THE FIRST FIXING SCREW EXTENDS FROM THE SECOND END OF THE THROUGH BORE AND SUCH THAT A CENTRAL PORTION OF THE FIRST FIXING SCREW IS IN DIRECT CONTACT WITH THE THROUGH BORE

AXIALLY FIXING THE FIRST FIXING SCREW IN THE THROUGH BORE

FIG. 14

OVERMOLDING A PULLEY ONTO AN OUTER RING OF A ROLLING BEARING SUCH THAT THE PULLEY EXTENDS RADIALLY OUTWARD FROM AN OUTER SURFACE OF THE OUTER RING, THE OVERMOLDING PROCESS COHESIVELY AFFIXING AN OPENING OF THE PULLEY ONTO THE OUTER RING, THE ROLLING BEARING ALSO INCLUDING AN INNER RING AND AT LEAST ONE ROW OF ROLLING ELEMENTS DISPOSED BETWEEN THE INNER RING AND THE OUTER RING, AND THE INNER RING DEFINING A BORE SURROUNDING A ROLLING BEARING AXIS OF ROTATION

OVERMOLDING A CYLINDRICAL SLEEVE IN THE BORE OF THE INNER RING, THE SLEEVE COMPRISING A CYLINDER HAVING A CYLINDER OUTER SURFACE AND A CYLINDER INNER SURFACE, THE CYLINDER OUTER SURFACE BEING COHESIVELY AFFIXED TO THE BORE OF THE INNER RING AND THE CYLINDER INNER SURFACE DEFINING A CYLINDRICAL THROUGH BORE HAVING A FIRST END AND A SECOND END

INSERTING A FIRST FIXING SCREW HAVING A FIRST END AND A SECOND END INTO THE FIRST END OF THE THROUGH BORE SO THAT THE FIRST END OF THE FIRST FIXING SCREW EXTENDS FROM THE FIRST END OF THE THROUGH BORE AND SUCH THAT THE SECOND END OF THE FIRST FIXING SCREW EXTENDS FROM THE SECOND END OF THE THROUGH BORE AND SUCH THAT A CENTRAL PORTION OF THE FIRST FIXING SCREW IS IN DIRECT CONTACT WITH THE THROUGH BORE

AXIALLY FIXING THE FIRST FIXING SCREW IN THE THROUGH BORE

BEFORE OVERMOLDING THE CYLINDRICAL SLEEVE IN THE THROUGH BORE, SELECTING THE FIRST FIXING SCREW FROM A PLURALITY OF FIXING SCREWS, EACH OF THE PLURALITY OF FIXING SCREWS HAVING A DIFFERENT OUTER DIAMETER

BEFORE INSERTING THE FIRST FIXING SCREW INTO THE THROUGH BORE, SELECTING AN INNER DIAMETER FOR THE CYLINDRICAL SLEEVE SUBSTANTIALLY THE SAME AS THE OUTER DIAMETER OF THE FIRST FIXING SCREW AND OVERMOLDING THE CYLINDRICAL SLEEVE IN THE BORE OF THE INNER RING SUCH THAT THE CYLINDRICAL SLEEVE HAS THE SELECTED INNER DIAMETER

FIG. 15

OVERMOLDING A PULLEY ONTO AN OUTER RING OF A ROLLING BEARING SUCH THAT THE PULLEY EXTENDS RADIALLY OUTWARD FROM AN OUTER SURFACE OF THE OUTER RING, THE OVERMOLDING PROCESS COHESIVELY AFFIXING AN OPENING OF THE PULLEY ONTO THE OUTER RING, THE ROLLING BEARING ALSO INCLUDING AN INNER RING AND AT LEAST ONE ROW OF ROLLING ELEMENTS DISPOSED BETWEEN THE INNER RING AND THE OUTER RING, AND THE INNER RING DEFINING A BORE SURROUNDING A ROLLING BEARING AXIS OF ROTATION

OVERMOLDING A CYLINDRICAL SLEEVE IN THE BORE OF THE INNER RING, THE SLEEVE COMPRISING A CYLINDER HAVING A CYLINDER OUTER SURFACE AND A CYLINDER INNER SURFACE, THE CYLINDER OUTER SURFACE BEING COHESIVELY AFFIXED TO THE BORE OF THE INNER RING AND THE CYLINDER INNER SURFACE DEFINING A CYLINDRICAL THROUGH BORE HAVING A FIRST END AND A SECOND END

INSERTING A FIRST FIXING SCREW HAVING A FIRST END AND A SECOND END INTO THE FIRST END OF THE THROUGH BORE SO THAT THE FIRST END OF THE FIRST FIXING SCREW EXTENDS FROM THE FIRST END OF THE THROUGH BORE AND SUCH THAT THE SECOND END OF THE FIRST FIXING SCREW EXTENDS FROM THE SECOND END OF THE THROUGH BORE AND SUCH THAT A CENTRAL PORTION OF THE FIRST FIXING SCREW IS IN DIRECT CONTACT WITH THE THROUGH BORE

AXIALLY FIXING THE FIRST FIXING SCREW IN THE THROUGH BORE

WHEREIN OVERMOLDING A PULLEY AND OVERMOLDING A CYLINDRICAL SLEEVE ARE CARRIED OUT AT THE SAME TIME

FIG. 16

TENSIONING ROLLER OR WINDER DEVICE AND METHOD OF MANUFACTURE

CROSS REFERENCE TO RELATED APPLICATIONS

This is a Divisional Patent Application, claiming the benefit of co-pending U.S. Non-Provisional patent application Ser. No. 12/741,529 filed on 16 Sep. 2010, which is a National Stage Application claiming the benefit of International Application Number PCT/FR2008/51906 filed on 22 Oct. 2008, which claims the benefit of France Patent Application Serial Number 0758818, filed on 06 Nov. 2007, all of which are incorporated herein by reference in their entireties.

FIELD OF THE INVENTION

The present invention relates to the field of tensioning rollers or winders designed to collaborate with a chain or belt, for example a timing belt of a motor vehicle internal combustion engine.

BACKGROUND OF THE INVENTION

Such rollers are generally used to keep the belt or chain tension always within a determined range or to make a local alteration to the path followed by this belt or chain. In the case of winding rollers, the pulley is mounted for rotation on a spindle via a rolling bearing, the roller then being fixed directly or indirectly to the engine block or to a part of the tensioning roller device, for example an articulated arm or an eccentric.

In many types of belt or chain rollers of the prior art, the pulley is overmolded onto the outer ring of the rolling bearing which is itself mounted directly on a fixing spindle attached to the engine block. Thus, the diameter of the bore in the inner ring has to be adapted to suit the radial dimension of the spindle used by the motor vehicle manufacturer. That runs counter to the practice of standardizing the rolling bearings used for such applications.

Document DE-A1-100 35 488 describes a mounting device for a belt pulley comprising a sleeve tube provided with a flange that forms a spacer piece for the inner ring of the rolling bearing, and with a retaining tube collaborating with the sleeve tube to press against the inner ring axially on the opposite side to the flange.

This solution has the disadvantage of entailing the use of two distinct elements in addition to the assembly formed of the rolling bearing and of the pulley, something which is disadvantageous for transporting, handling and fitting these elements.

Document FR-B1-2 758 375 describes a tensioning roller comprising a pivoting body, a rolling bearing mounted on the said body, and a bushing made of metal to accept the fixing spindle intended to be attached to the engine block. The pivoting body is obtained by overmolding a synthetic material in the bore of the rolling bearing and over the exterior surface of the bushing.

Again, document DE-U1-298 05 581 discloses a tensioning roller comprising a rolling bearing, a pulley overmolded on the outer ring of the rolling bearing, and a filler piece overmolded in the bore of the inner ring of the rolling bearing and on a fixing spindle.

The tensioning rollers described in these two documents have the major disadvantage that they cannot be easily adapted to suit the size of the spindle or of the fixing screw designed to be mounted on the engine block.

SUMMARY OF THE INVENTION

It is therefore an object of the present invention to overcome these disadvantages.

More particularly, the present invention sets out to provide a tensioning roller device that is particularly easy to manufacture, to fit, and is of small size.

A further object of the present invention is to provide a device that can be easily and economically adapted to suit the size of the fixing screws that are to be used by the motor vehicle manufacturers.

To this end, the chain or belt tensioning roller or winder device is provided with a rolling bearing comprising an inner ring, an outer ring and at least one row of rolling elements mounted between the rings, with a pulley overmolded onto the outer ring and with a fixing screw axially immobilized with respect to the rolling bearing. The device comprises a sleeve overmolded inside the bore of the inner ring and provided with a through-bore for mounting the fixing screw. The sleeve further comprises means for axially retaining the fixing screw inside the through-bore of the sleeve.

Thus, various tensioning roller devices can be produced in a particularly economical manner using rolling bearings of the same size. Specifically, the bore of the pulley is adapted to suit the diameter of the fixing screw by adapting the sleeve which is advantageously made of a synthetic material. The use of such a sleeve makes it particularly simple to fit. The existence of the through-bore in the sleeve allows the use of a standard fixing screw or spindle. Furthermore, having a sleeve provided with means of axially retaining the fixing screw means that it is possible to obtain an individual assembly that can be stored, transported and handled without the risk of its component parts becoming detached, and this can be done without the need for additional separate elements. Specifically, the sleeve itself comprises the retaining means which may advantageously be formed as one piece therewith.

Advantageously, the fixing screw is in direct contact with the through-bore.

In one embodiment, the axial-retention means comprise a threaded portion able to collaborate with a threaded portion of the fixing screw.

In one embodiment, the outside diameter of the sleeve is smaller than the inside diameter of a frontal radial surface of the inner ring.

Thus, after the sleeve has been overmolded, the rolling bearing is a bearing that has an inner ring with an entirely unencumbered radial frontal surface. This makes mounting elements against the said frontal surface of the ring, for example an axial end stop member, far easier.

In one embodiment, frontal radial surfaces of the sleeve are set back from or flush with frontal radial surfaces of the inner ring.

Advantageously, the sleeve comprises, at one axial end, a spacer piece which bears axially against the inner ring.

In one embodiment, the sleeve is an eccentric sleeve.

The device may also comprise a protective end plate mounted on the sleeve. The protective end plate advantageously comprises a tubular axial portion fitted into a large-diameter portion of the bore of the sleeve. The end plate may be mounted pressing against a frontal radial surface of the inner ring.

In one embodiment, the pulley and the sleeve are made of one and the same synthetic material.

BRIEF DESCRIPTION OF THE DRAWINGS

The present invention will be better understood from studying the detailed description of some embodiments taken by way of non-limiting examples and illustrated by the attached drawings in which:

FIG. 14 is a flowchart showing a method according to an embodiment of the present disclosure, FIG. 15 is a flowchart showing a method according to another embodiment of the present disclosure, and FIG. 16 is a flowchart showing a method according to another embodiment of the present disclosure.

DETAILED DESCRIPTION OF THE INVENTION

Figure 1:
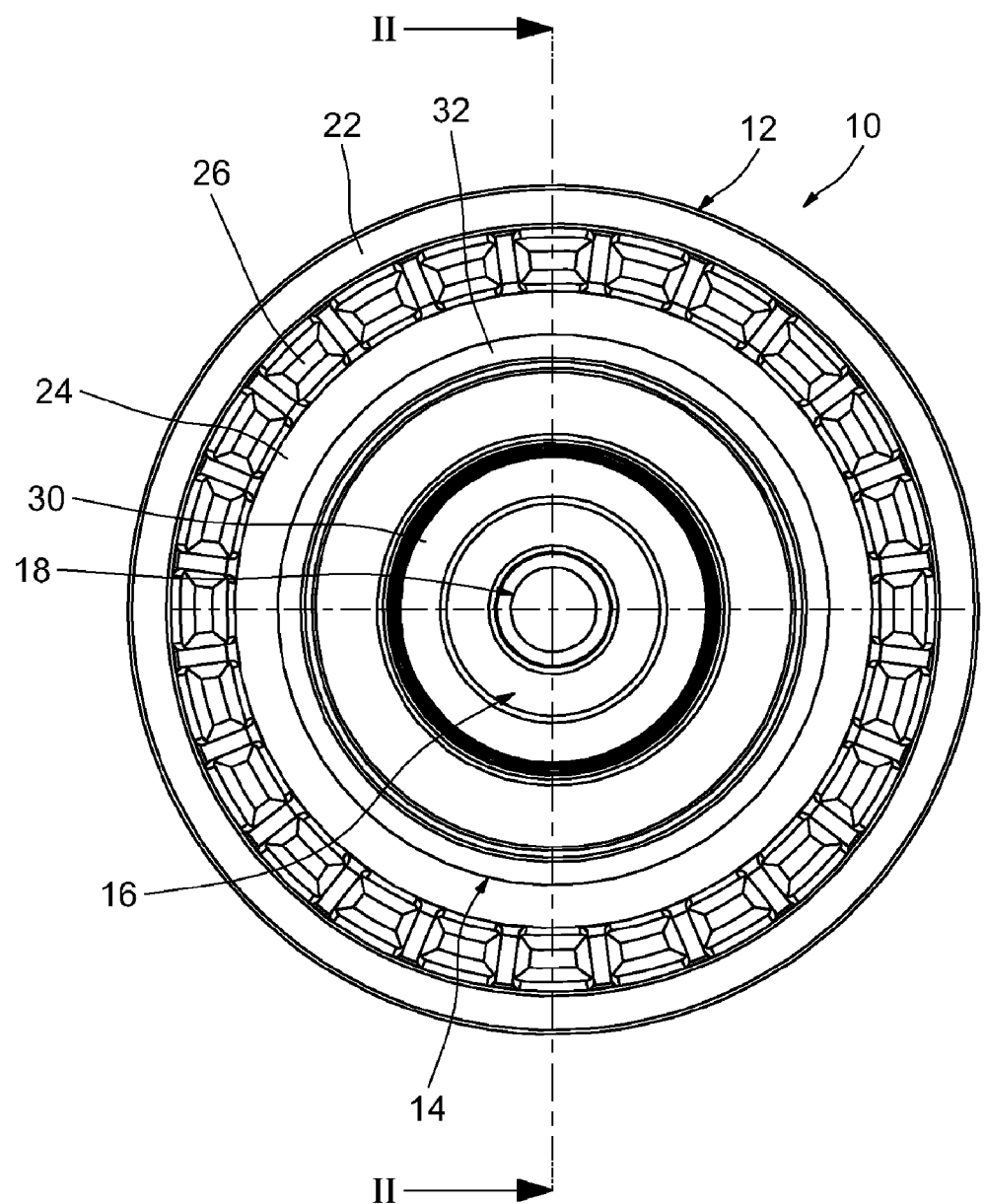
FIG. 1 is a front elevation of a roller for a belt or chain according to a first embodiment of the invention.
Figure 2:
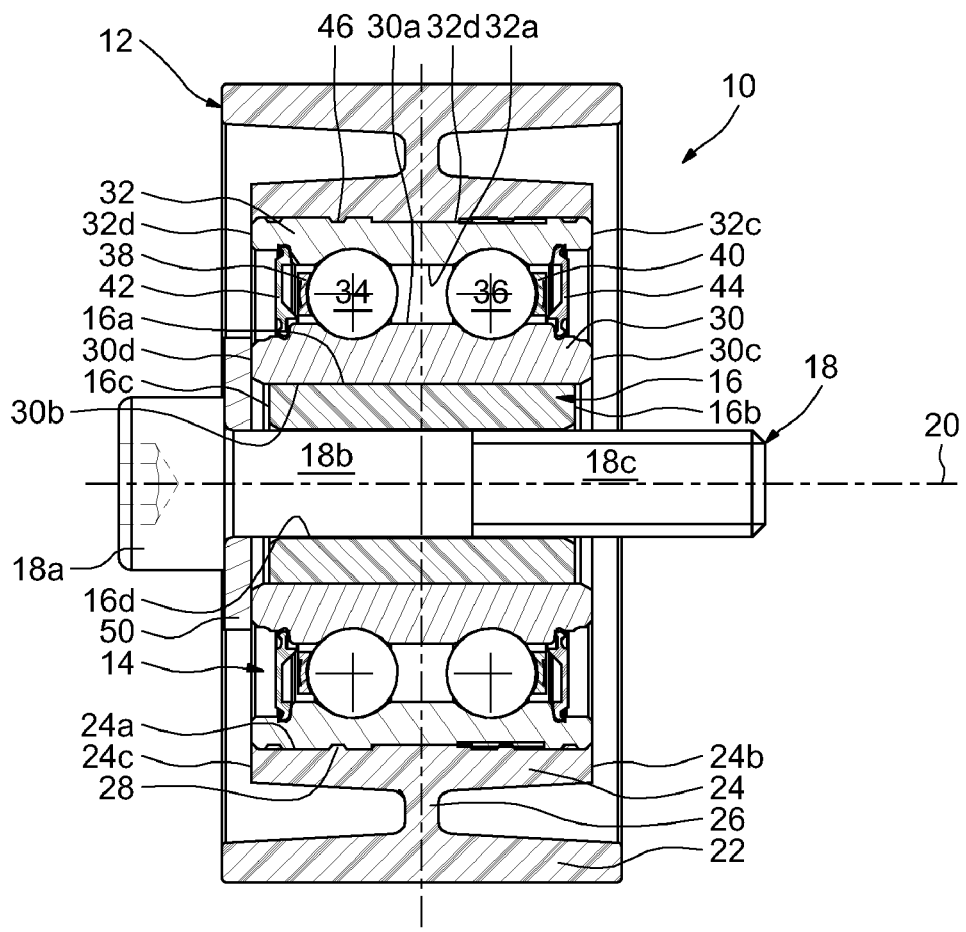
FIG. 2 is an axial section on II-II of FIG. 1.

As may be seen in FIGS. 1 and 2, the roller referenced 10 overall comprises a pulley 12, a rolling bearing 14 of axis 20, an annular sleeve 16 and a fixing screw 18 coaxial with the axis 20.

The pulley 12 comprises an outer part 22 that offers an exterior surface intended to collaborate with a belt or chain (not depicted), an axial interior part 24 and a radial annular intermediate portion 26 connecting said parts. The outer 22 and inner 24 parts are coaxial with the axis 20. The inner part 24 has a bore 24a equipped with annular ribs 28 and axially delimited by two lateral radial surfaces 24b and 24c.

The rolling bearing 14 comprises an inner ring 30, an outer ring 32, two rows of rolling elements 34 and 36 arranged in parallel planes and held respectively in position by cages 38 and 40, and two seals 42 and 44.

The inner ring 30 comprises an outer surface 30a of revolution in which there have been formed raceways for the rolling elements 34 and 36, and grooves to provide contact with lips of the sealing members 42 and 44. The inner ring 30 also comprises a bore 30b in contact with the sleeve 16 delimited by two lateral frontal radial surfaces 30c and 30d. The cages 38 and 40 keep the rolling elements 34 and 36 uniformly circumferentially spaced. The outer 32 and inner 30 rings are respectively one-piece rings.

The outer ring 32 is provided with a bore 32a in which there have been formed raceways for the rolling elements 34 to 36 and grooves into which the sealing members 42 and 44 are fitted. The sealing members 42 and 44 provide a static seal against the rotating outer ring 32 and a dynamic seal against the non-rotating inner ring 30. The outer ring 32 also comprises an outer surface 32d and frontal radial surfaces 32b and 32c axially aligned with the radial surfaces 30c and 30d. Annular grooves 46 are formed from the outer surface 32d of the outer ring 32 to complement the shape of the ribs 28 projecting from the bore 24a of the pulley 12.

The pulley 12 is overmolded on the outer ring 32. This results in excellent cohesion between these two components, particularly at the annular grooves 46 of the outer ring 32 which the molten plastic enters to form the annular ribs 28 of the pulley 12 through complementary shaping.

The sleeve 16, of annular overall shape with axis 20, has an exterior surface 16a which is a cylinder of revolution, two lateral frontal radial surfaces 16b and 16c, and a cylindrical through-bore 16d in contact with the screw 18. The bore 16d or central opening passes axially right through the sleeve 16 and opens onto the surfaces 16b and 16c.

The sleeve 16 is overmolded in the bore 30b of the inner ring 30. This then provides excellent cohesion between these two components. Although in the exemplary embodiment illustrated, the bore of the inner ring 30 is a plane bore, it will be appreciated that it might be possible to provide annular or helical grooves in the said bore facing radially towards the sleeve 16 so as to obtain annular or helical ribs of complementing shapes as the molten plastic enters them.

The sleeve 16 has an axial dimension smaller than that of the ring 30, and is arranged in such a way that the frontal radial surfaces 16b, 16c are set back from the frontal radial surfaces 30c, 30d of the inner ring. The outside diameter of the sleeve 16 is smaller than the inside diameter of the frontal radial surfaces 30c, 30d of the inner ring. The sleeve 16 therefore leaves the said radial surfaces 30c, 30d completely uncluttered so that they can be used as reference surfaces and come to bear against any other radial surface.

Advantageously, the pulley 12 and the sleeve 16 are overmolded on the rolling bearing 14 in one and the same manufacturing mould, preferably using the same synthetic material, so as to obtain an economical roller 10 that requires a low number of manufacturing operations. However, as an alternative, a different synthetic material could be provided for the sleeve 16, for example a material that is more flexible than that used for the pulley 12 and that has good vibration-damping characteristics.

The screw 18 for its part has a head 18a and a shank that has a plane portion 18b near the head and a threaded portion 18c at the opposite end from the said head. The threaded portion 18c which projects axially with respect to the pulley 12 can be inserted into a tapped hole created in a component intended to support the roller 10. Axially on the opposite side, there is a washer 50 positioned between the head 18a and the frontal radial surface 30d of the inner ring 30 left clear by the sleeve 16. The sleeve 16 is advantageously used to form a means of axially retaining the fixing screw 18. For this, the screw 18 is designed to be a fairly close fit in the bore 16d of the said sleeve. This class of fit is designed to ensure that the two elements are axially secured to one another with no risk of coming apart while the device is being stored, transported and handled.

Figure 3:
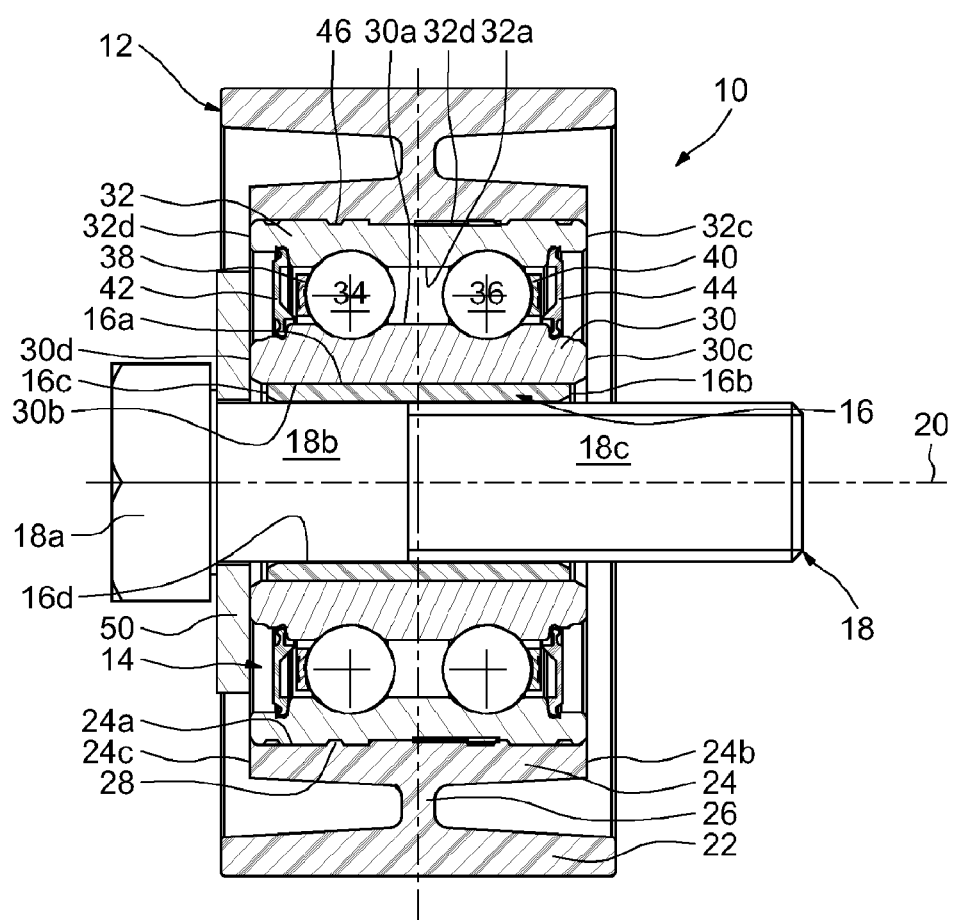
FIG. 3 is an axial section through a roller according to a second embodiment of the invention.

The embodiment illustrated in FIG. 3, in which elements that are identical bear the same references, differs only in that the bore 16d of the sleeve 16 is enlarged so that a larger-diameter fixing screw 18 can be fitted. The close fit between the sleeve 16 and the fixing screw 18 is, however, maintained. Thus, the sleeve 16 can be used to adapt the same type and size of rolling bearing 14 to suit the various different diameters of fixing screw 18. One and the same type of rolling bearing can thus be used for several types of roller 10.

Figure 4:
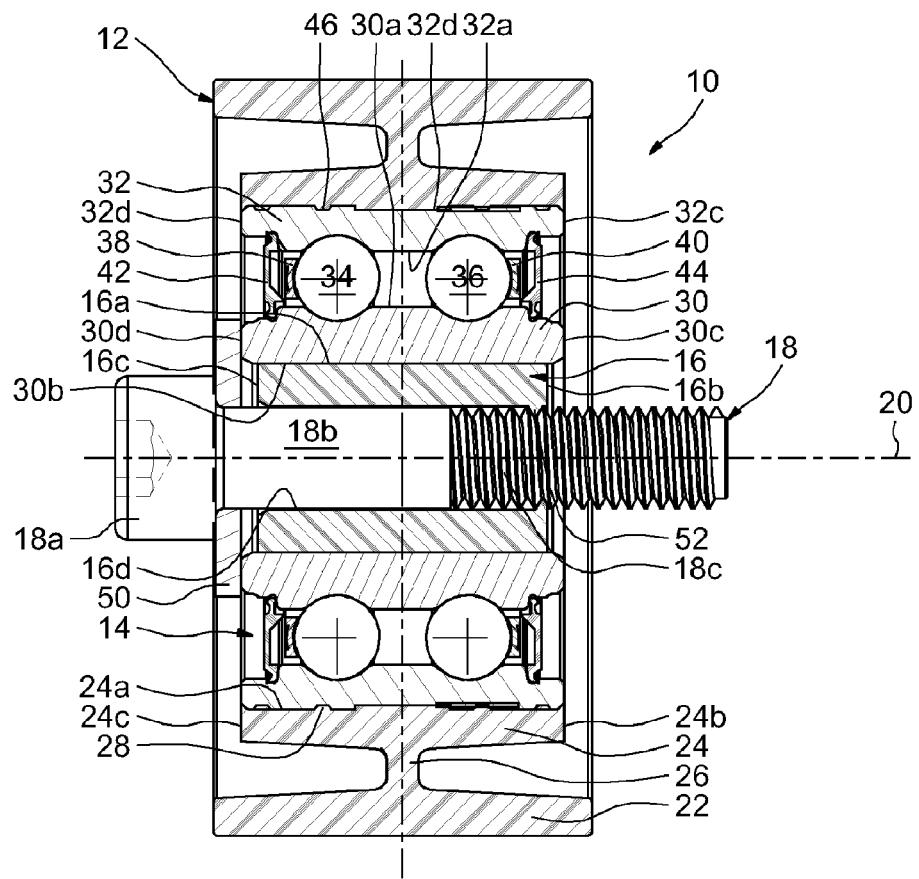
FIG. 4 is an axial section through a roller according to a third embodiment of the invention.
Figure 5:
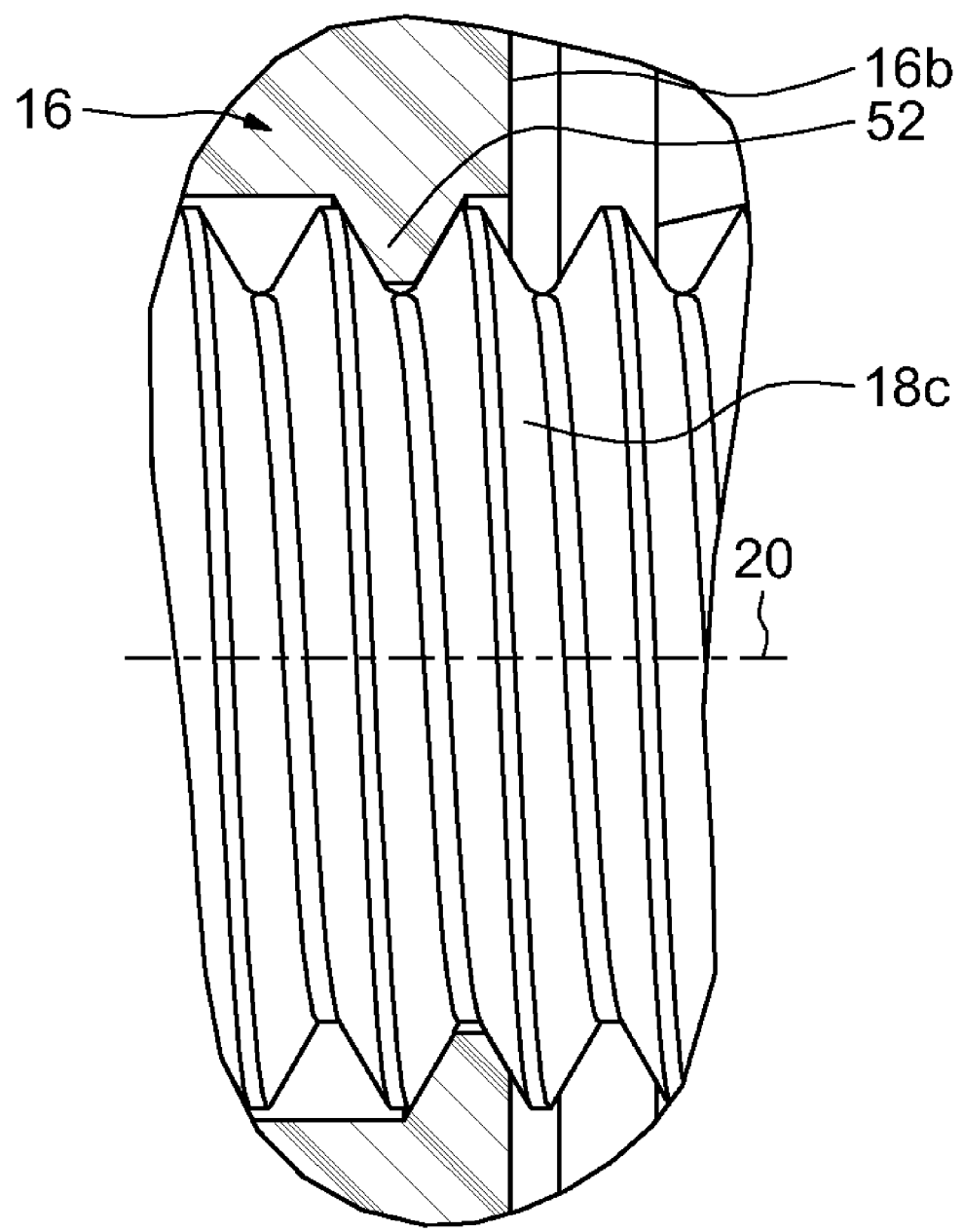
FIG. 5 is a view of a detail of FIG. 4, FIGS. 6 to 8 are axial sections through a roller according to fourth, fifth and sixth embodiments of the invention.

The embodiment illustrated in FIGS. 4 and 5, in which elements that are identical bear the same references, differs from the first embodiment in that the sleeve 16 comprises, near the radial frontal surface 16b, an annular threaded portion 52 extending radially inwards and collaborating with the threaded portion 18c of the fixing screw 18 so as to provide axial retention of the screw inside the sleeve 16.

By way of an alternative, this threaded portion 52 could be replaced by one or more pegs projecting radially inwards.

Figure 6:
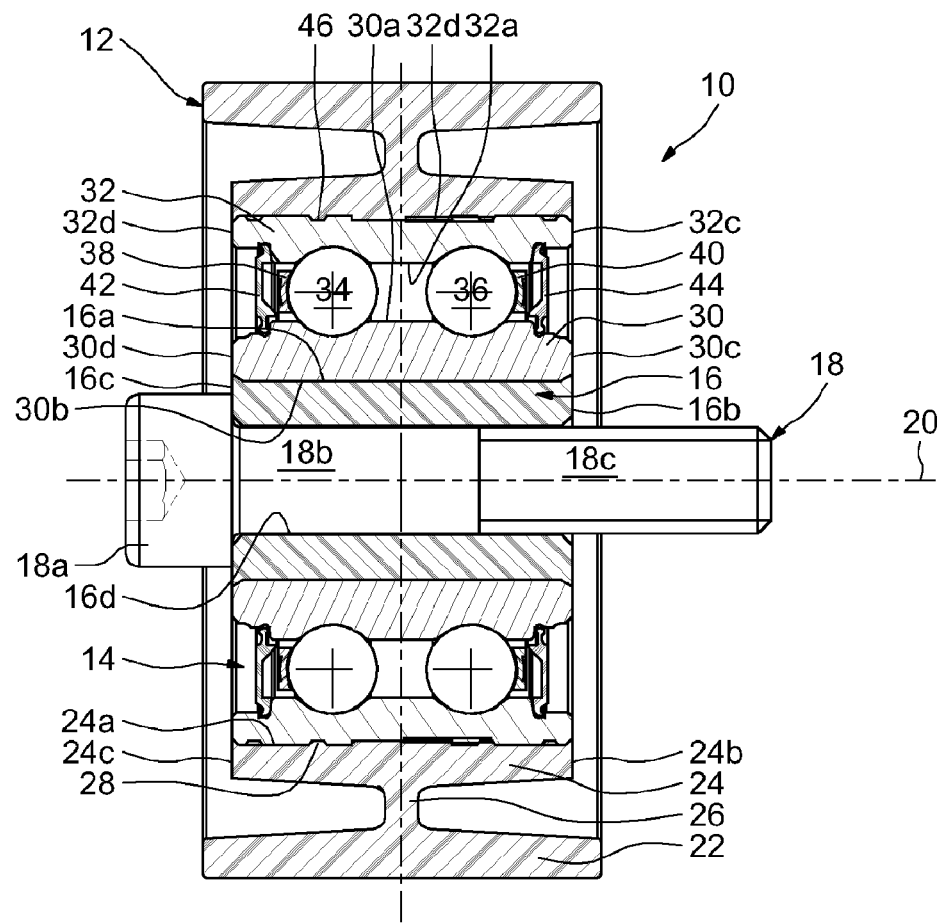

The embodiment illustrated in FIG. 6, in which elements that are identical bear the same references, differs from the first embodiment in that the sleeve 16 has an axial dimension equal to the inner ring 30. The frontal radial surfaces 16b and 16c are respectively aligned with or flush with the frontal surfaces 30c and 30d of the inner ring 30. The sleeve 16 does, however, leave the said frontal radial surfaces 30c and 30d uncluttered. In this embodiment, the roller 10 has no thrust washer for the head 18a of the screw, the said head coming to bear directly against the frontal surface 16c of the sleeve 16.

Figure 7:
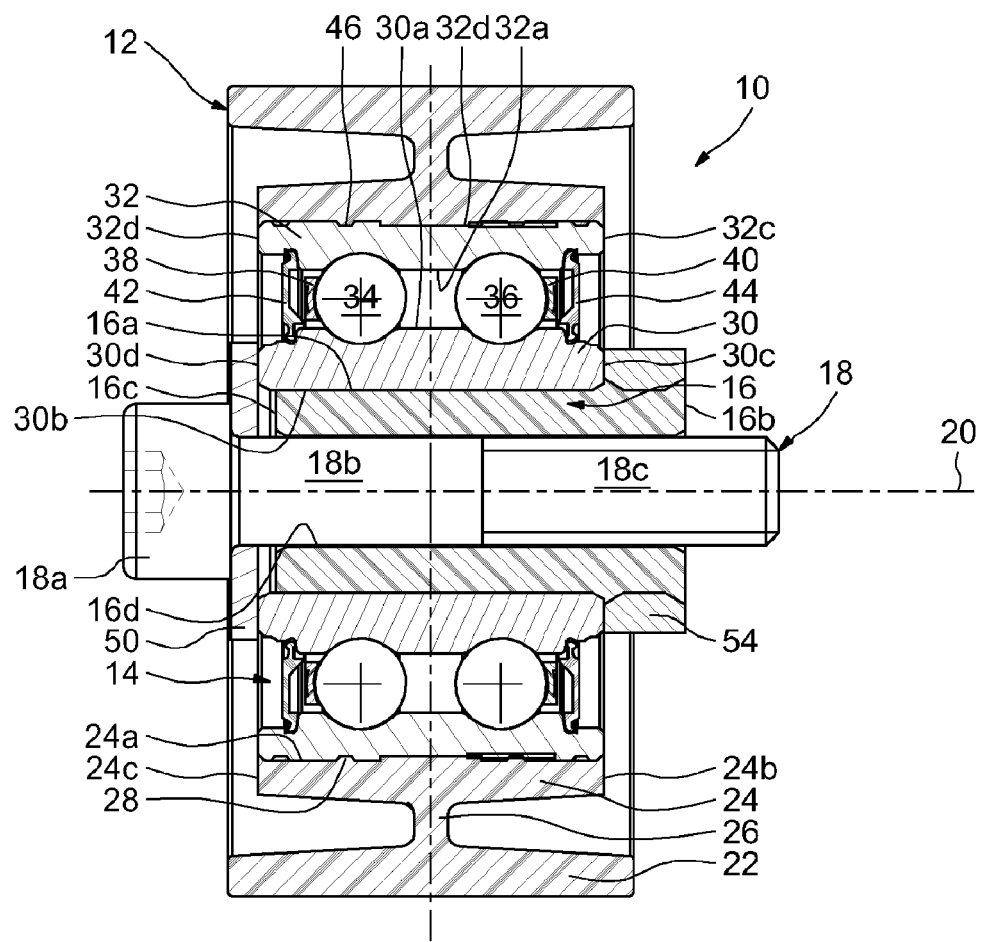

The embodiment illustrated in FIG. 7 in which elements that are identical bear the same references differs from the first embodiment in that the sleeve 16 has an increased axial length and projects axially from the frontal surface 30c of the inner ring 30. However, the sleeve 16 leaves the said frontal radial surface uncluttered. It has an annular spacer piece 54 that bears against the said surface 30c of the inner ring 30. The spacer piece 54, advantageously made of metal, is overmolded on the outer surface 16a of the sleeve 16. It is advantageously placed in the mould used to manufacture the roller 10 at the same time as the bearing 14, the overmolding of the pulley 12 and of the sleeve 16 yielding a non-dissociable rolling-bearing/sleeve/spacer-piece assembly.

Figure 8:
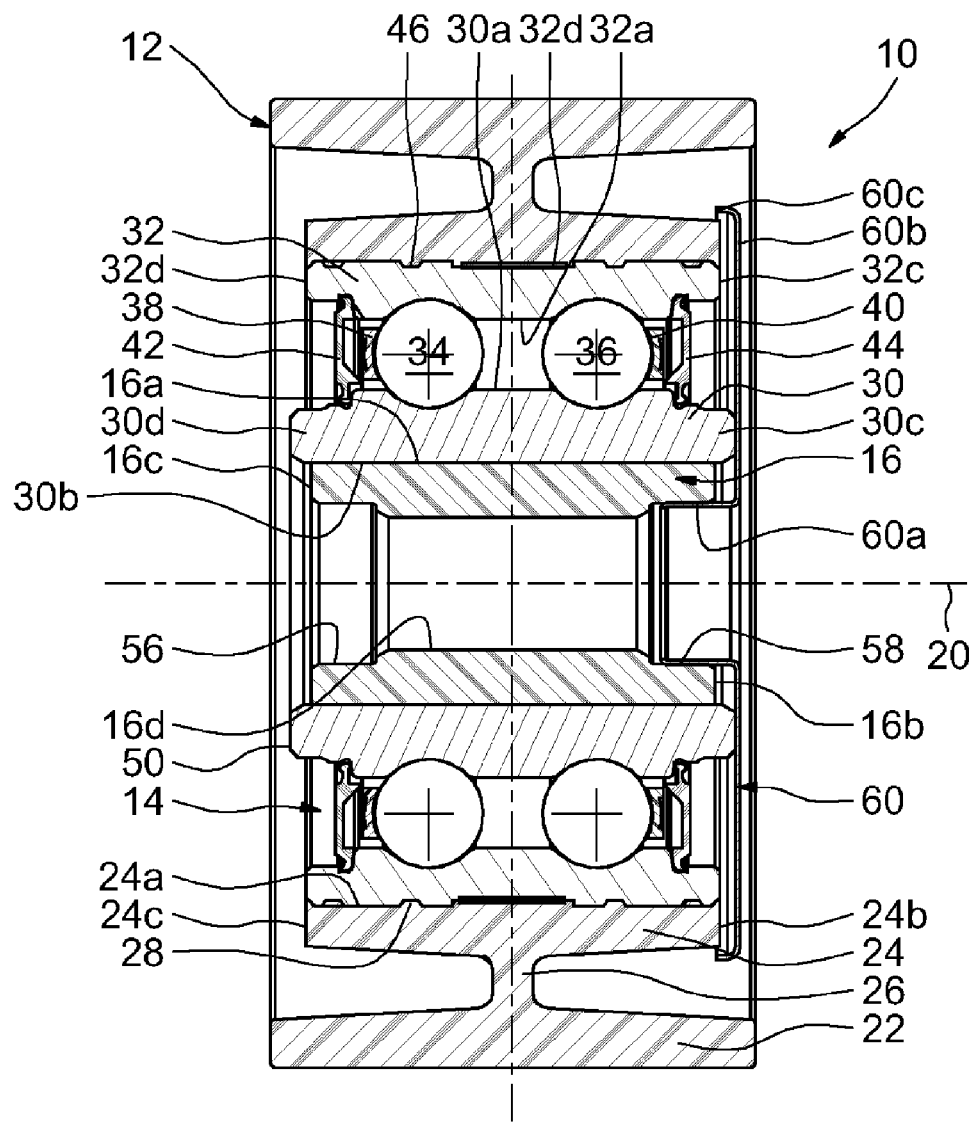

The embodiment illustrated in FIG. 8 in which elements that are identical bear the same references differs from the first embodiment in that the sleeve 16 comprises, at each axial end of the bore 16d, two larger-diameter portions 56, 58. The sleeve 16 has a stepped bore 16d. The roller 10 also has a protective end plate 60, advantageously made of sheet metal, and adopting the form of a cup of annular overall shape. The end plate 60 has an annular axial portion 60a fitted inside the larger-diameter portion 58 of the bore 16b to allow the fixing screw (not depicted) through. The said screw can be mounted with a slight clearance fit in the portion 60a so as to hold the assembly together. The axial portion 60 is extended radially outwards at a free end by a radial portion 60b that comes to bear against the frontal surface 30c of the inner ring 30 and that extends into the vicinity of the interior portion 24 of the pulley 12. The radial portion 60b is extended axially, at its large-diameter edge towards the pulley 12, by an axial portion 60c situated radially in close proximity to the interior portion 24 and thus forming a seal on account of the narrowness of the passage.

Figure 9:
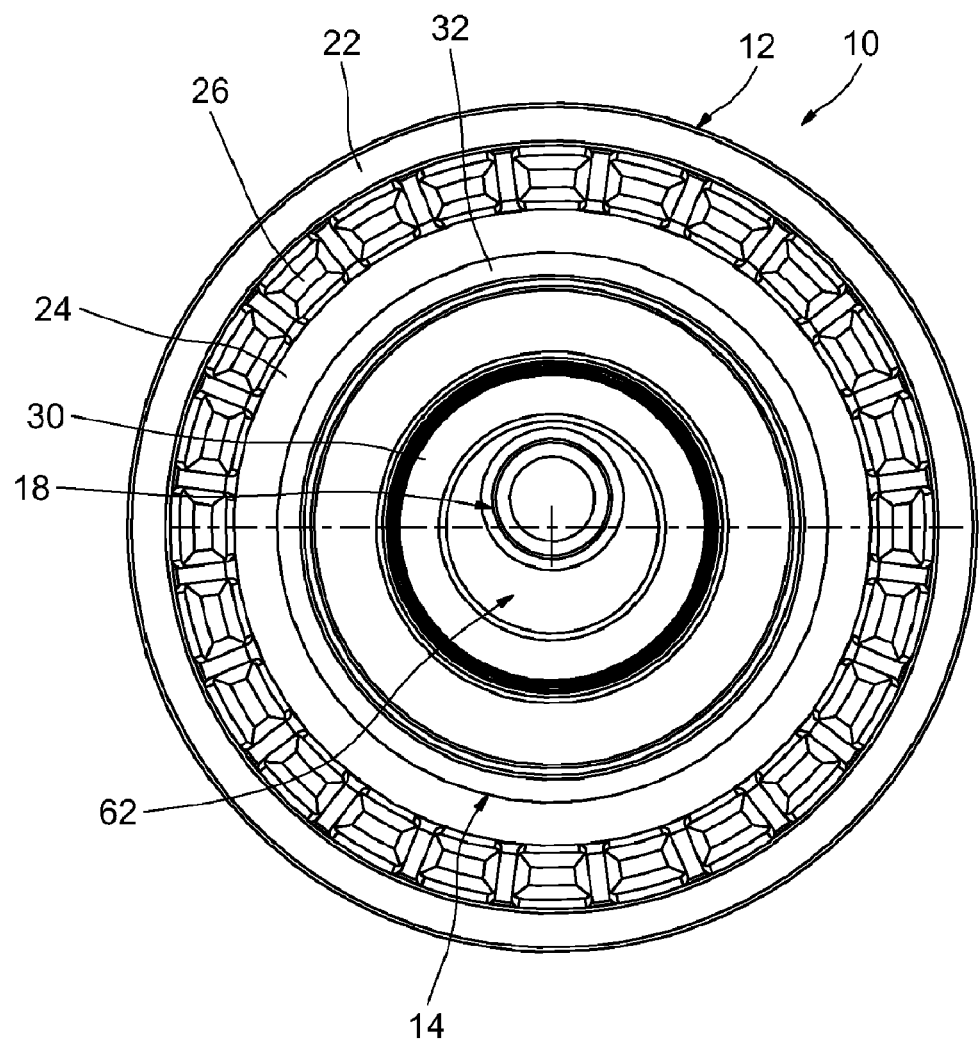
FIGS. 9 and 10 are front elevations of a roller according to a seventh embodiment of the invention.
Figure 10:
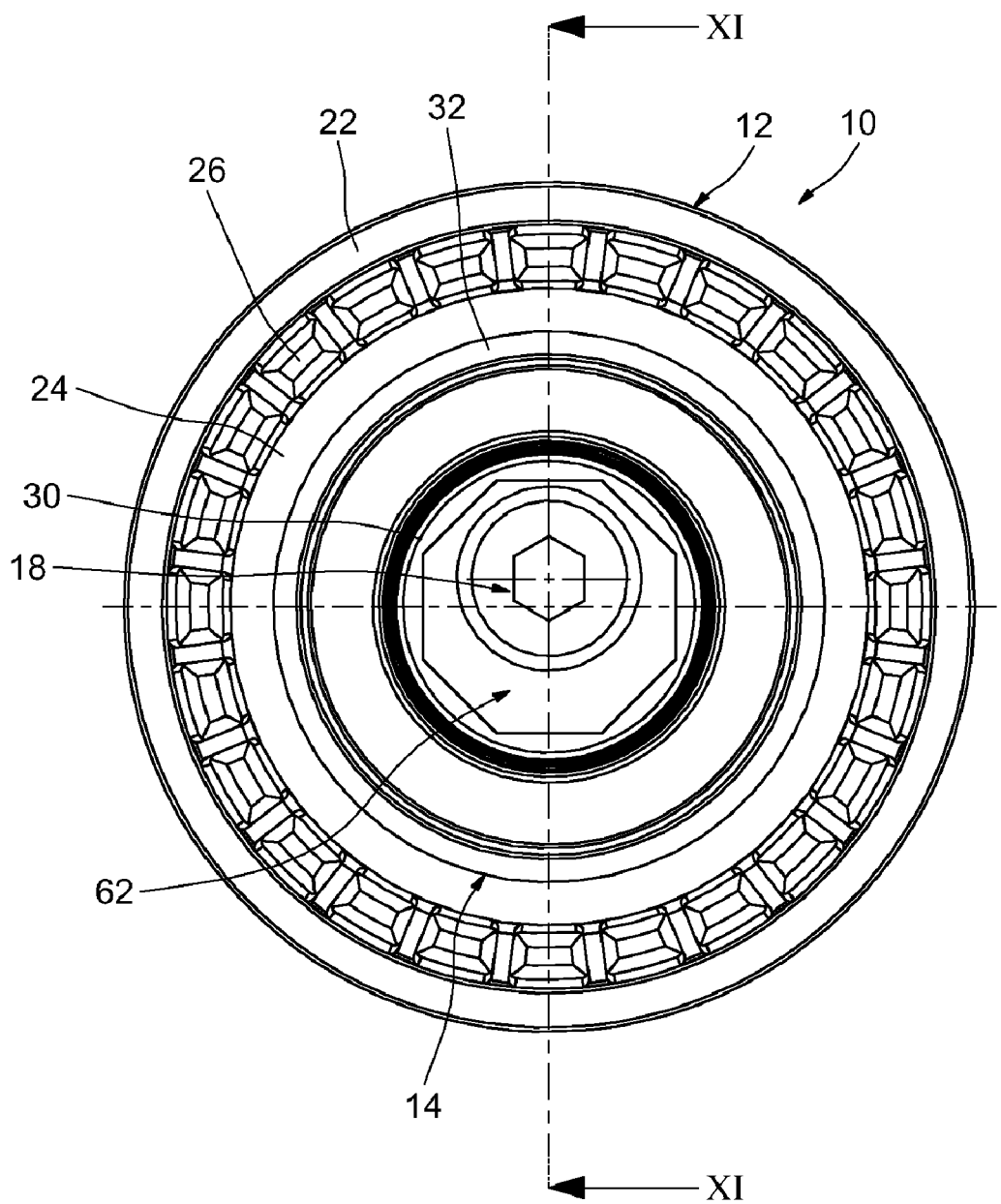
Figure 11:
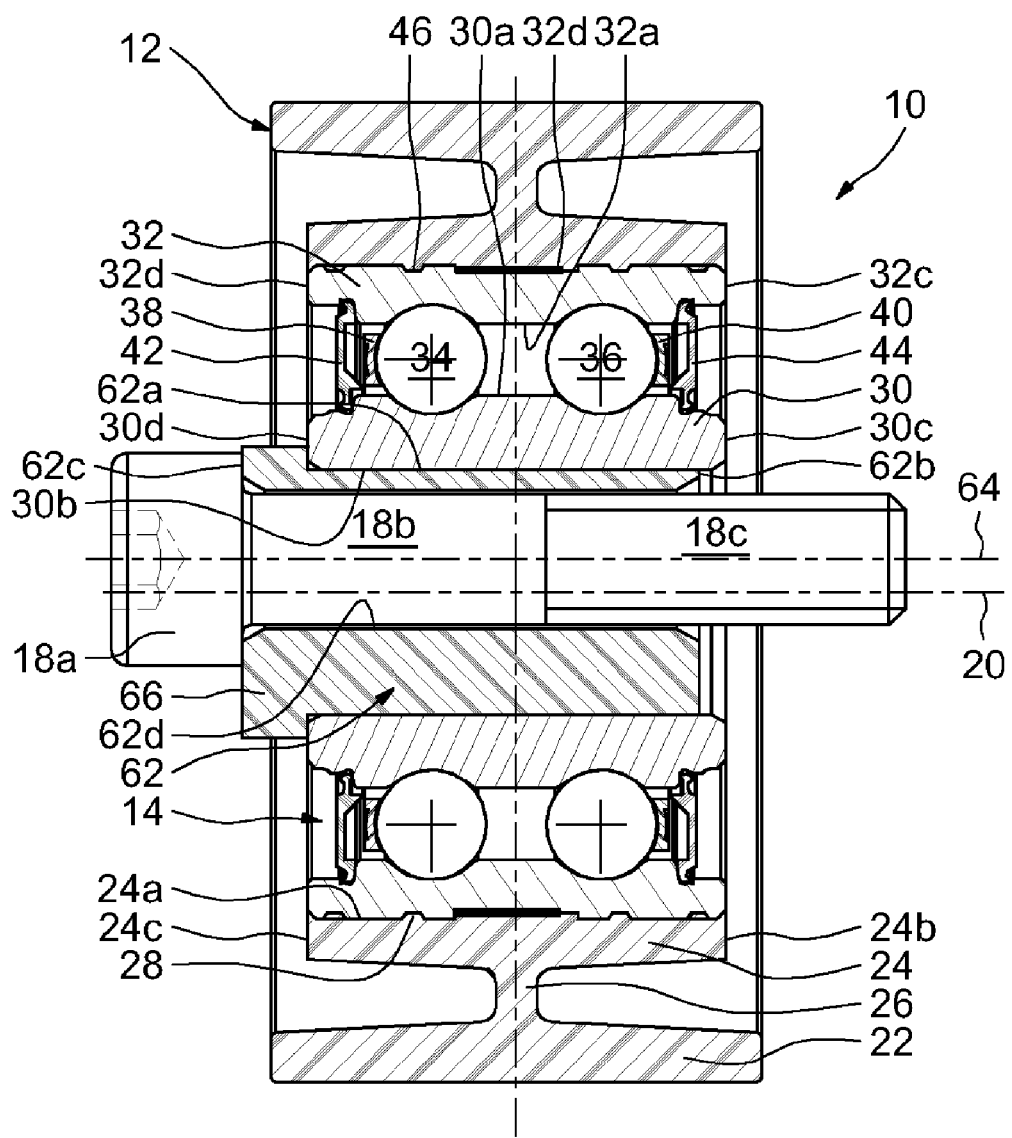
FIG. 11 is a section on XI-XI of FIG. 10.

The embodiment illustrated in FIGS. 9 to 11 in which elements that are identical bear the same references differs from the first embodiment in that the roller 10 comprises an eccentric sleeve 62, of axis 64 that is offset radially with respect to the axis 20 of the rolling bearing 14. The eccentric sleeve 62 has a cylindrical exterior surface 62a in contact with the bore 30b of the inner ring 30, two lateral frontal radial surfaces 62b and 62c, and a through-bore 62d in which to mount the screw 18. The radial surface 62b is set back from the frontal surface 30c of the inner ring 30. The sleeve 62 is overmolded in the bore 30b of the inner ring 30.

The eccentric sleeve 62 comprises, at one axial end, a radial flange 66 comprising the radial surface 62c and coming to bear against the radial surface 30d on the inner ring 30. The head 18a of the screw 18 bears against the radial surface 62c axially on the opposite side to the inner ring 30. The flange 66 has a hexagonal overall shape so that a correspondingly shaped spanner can be used to perform manual adjustment of the angular position of the eccentric sleeve 62 and therefore of the tension in the belt or chain. Of course, this adjustment is performed before the fixing screw 18 is tightened.

Figure 12:
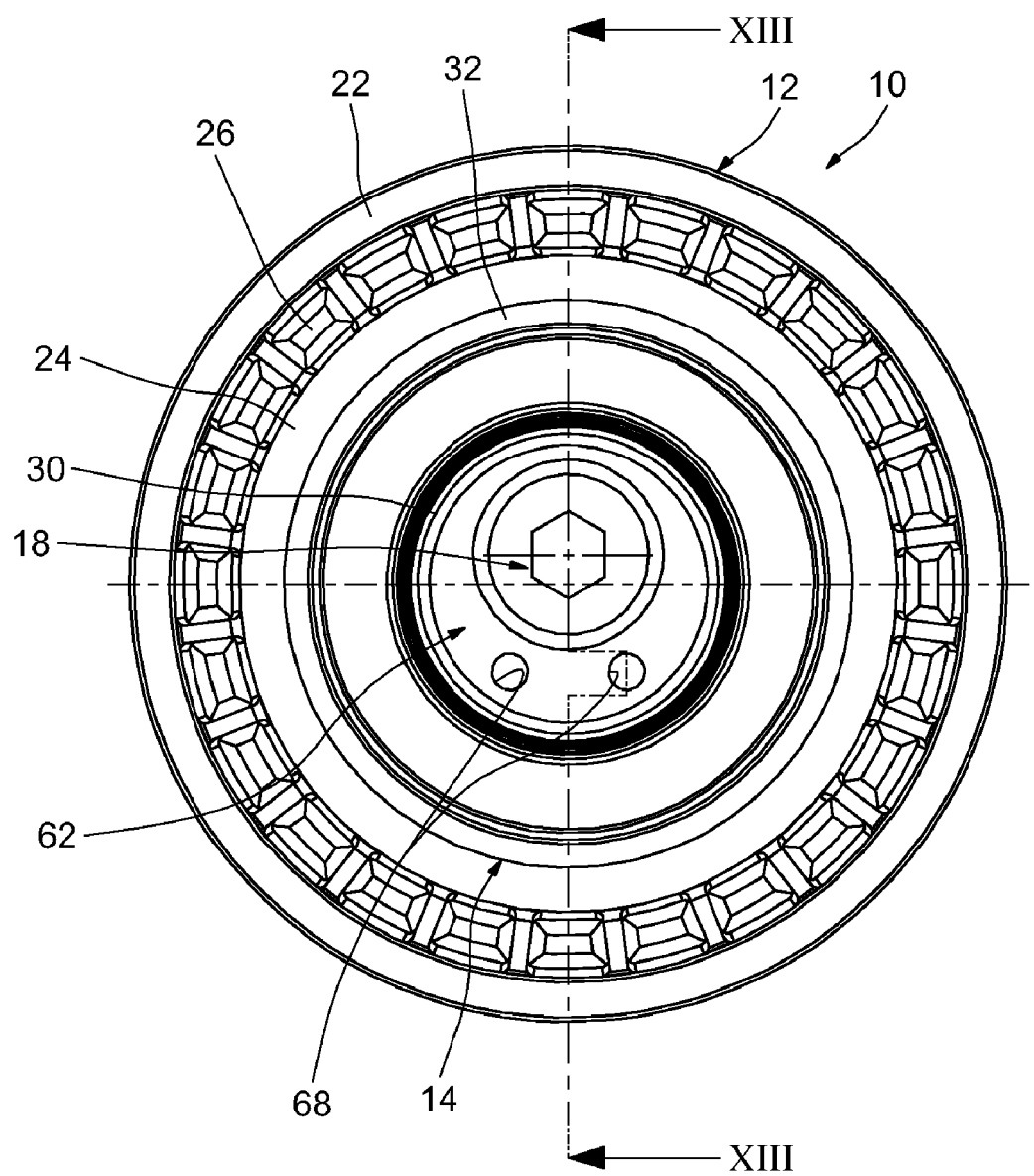
FIG. 12 is a front elevation of a roller according to an eighth embodiment of the invention.
Figure 13:
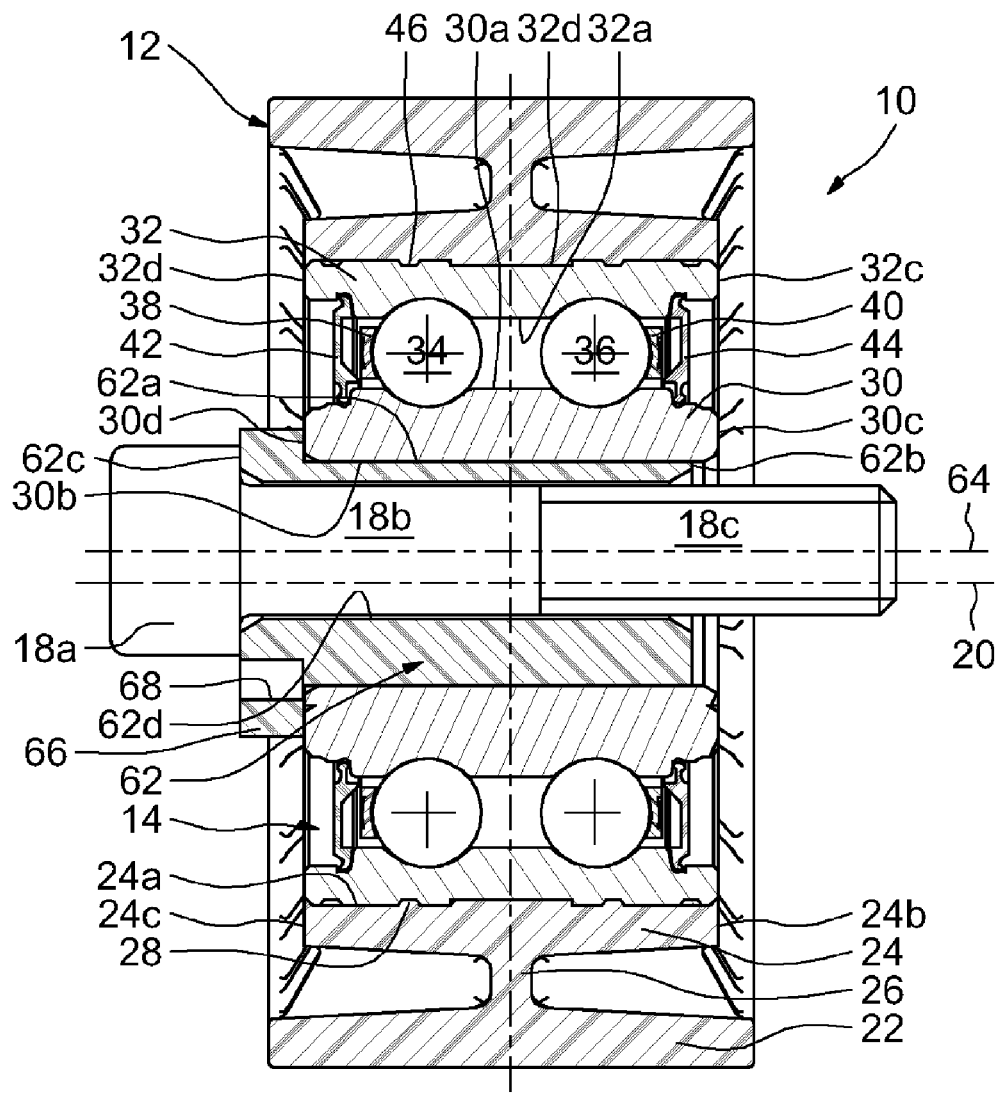
FIG. 13 is a roller in section on XIII-XIII of FIG. 12.

The embodiment illustrated in FIGS. 12 and 13 differs from the embodiment previously described in that the radial flange 66 is of cylindrical overall shape and has two cylindrical recesses 68 open at both ends so that the belt or chain tension can be adjusted using a pin spanner.

In the embodiments illustrated in FIGS. 6 to 13, the sleeve 16 is also given a tolerance that makes it possible to obtain a close fit between it and the fixing screw 18 which fit is close enough to ensure axial retention of the said screw.

By virtue of the invention, roller devices that can be adapted to suit various diameters of screw are thus produced economically using the same rolling bearings. Specifically, the pulley bore size is adapted to suit the diameter of the screw through the agency of the sleeve which is made of plastic. Furthermore, the sleeve provides axial retention for the fixing screw or for other elements such as a spacer piece or protective end plate which are designed to bear against one of the rings of the rolling bearing.

The invention claimed is:

1. A method of manufacturing a tensioning roller or winder device, the method comprising:
    overmolding a pulley onto an outer ring of a rolling bearing such that the pulley extends radially outward from an outer surface of the outer ring, the overmolding process cohesively affixing an opening of the pulley onto the outer ring, the rolling bearing also including an inner ring and at least one row of rolling elements disposed between the inner ring and the outer ring, and the inner ring defining a bore surrounding a rolling bearing axis of rotation;
    selecting a first fixing screw having a first end and a second end from a plurality of fixing screws, each of the plurality of fixing screws having a different outer diameter;
    after selecting the first fixing screw, overmolding a cylindrical sleeve in the bore of the inner ring, the sleeve comprising a cylinder having a cylinder outer surface and a cylinder inner surface, the cylinder outer surface being cohesively affixed to the bore of the inner ring and the cylinder inner surface defining a cylindrical through bore having an inner diameter substantially the same as the outer diameter of the first fixing screw and having a first end and a second end;
    inserting the first fixing screw into the first end of the through bore so that the first end of the first fixing screw extends from the first end of the through bore and such that the second end of the first fixing screw extends from the second end of the through bore and such that a central portion of the first fixing screw is in direct contact with the through bore; and
    axially fixing the first fixing screw in the through bore.

2. The method according to claim 1, wherein the cylindrical sleeve has first and second axial ends, wherein the bearing inner ring has first and second axially ends and wherein the first and second axial ends of the cylindrical sleeve are located axially inward of the first and second axial ends of the bearing inner ring.

3. The method according to claim 1, wherein the cylindrical sleeve has first and second axial ends, wherein the bearing inner ring has first and second axially ends and wherein the first and second axial ends of the cylindrical sleeve are flush with the first and second axial ends of the bearing inner ring.

4. The method according to claim 1, wherein axially fixing the first fixing screw comprising screwing the first fixing screw into the cylindrical inner surface.

5. The method according to claim 1, wherein the cylindrical sleeve has first and second axial ends, wherein the bearing inner ring has first and second axially ends, wherein the first end of the cylindrical sleeve projects out of the first end of the bore of the inner ring and including mounting a spacer on the first end of the cylindrical sleeve in contact with the first axial end of the bearing inner ring.

6. The method according to claim 1, including mounting a protective end plate on the rolling bearing with an inner cylindrical portion of the protective end plate inserted in the through bore and a disk-shaped portion of the protective plate radially outward of the inner cylindrical portion axially overlying the first axial surface of the inner ring and a first axial surface of the bearing outer ring.

7. The method according to claim 1 wherein overmolding a pulley and overmolding a cylindrical sleeve are carried out at the same time.

8. The method according to claim 1, wherein the through bore has a substantially constant inner diameter from the first axial end to the second axial end.

9. The method of claim 1, wherein overmolding the cylindrical sleeve comprises overmolding the cylindrical sleeve such that a central longitudinal axis of the cylindrical sleeve is offset from the rolling bearing axis of rotation.

10. The method of claim 1, wherein overmolding the first cylindrical sleeve comprises overmolding the first cylindrical sleeve such that a central longitudinal axis of the first cylindrical sleeve is offset from a rolling bearing axis of rotation.

* * * * *